US012608945B2

(12) United States Patent
Kim et al.

(10) Patent No.: US 12,608,945 B2
(45) Date of Patent: Apr. 21, 2026

(54) 360-DEGREE REAL-TIME VIDEO STREAMING AND ENVIRONMENTAL ANALYSIS SYSTEM AND METHOD

(71) Applicant: TSP XR, Nowon-gu (KR)

(72) Inventors: Hoi Jun Kim, Dobong-gu (KR); Chi Seo Jeong, Nowon-gu (KR); Chan Soo Park, Gangbuk-gu (KR); In Seon Kim, Dongjak-gu (KR); Jin Kyu Kang, Yongsan-gu (KR); Hyeon Yong Son, Gwangju-si (KR)

(73) Assignee: TSP XR, Nowon-gu (KR)

( * ) Notice: Subject to any disclaimer, the term of this patent is extended or adjusted under 35 U.S.C. 154(b) by 0 days.

(21) Appl. No.: 18/983,598

(22) Filed: Dec. 17, 2024

(65) Prior Publication Data

US 2026/0105748 A1 Apr. 16, 2026

(30) Foreign Application Priority Data

Oct. 15, 2024 (KR) ......................... 10-2024-0139994

(51) Int. Cl.
*G06V 20/52* (2022.01)
*G06V 10/56* (2022.01)
(Continued)

(52) U.S. Cl.
CPC .............. *G06V 20/52* (2022.01); *G06V 10/56* (2022.01); *G06V 10/95* (2022.01); *G06V 40/15* (2022.01);
(Continued)

(58) Field of Classification Search
CPC ........ G06V 20/52; G06V 10/56; G06V 10/95; G06V 40/15; G06V 40/16; G06V 40/171;
(Continued)

(56) References Cited

U.S. PATENT DOCUMENTS

2013/0241728 A1 9/2013 Spector
2015/0381948 A1* 12/2015 Renkis .................. G06T 19/003
348/47

(Continued)

FOREIGN PATENT DOCUMENTS

CN 106725536 A 5/2017
CN 114724068 A 7/2022
KR 10-2627538 B1 1/2024

OTHER PUBLICATIONS

Chen et al. "DeepPhys: Video-Based Physiological Measurement Using Convolutional Attention Networks" Mar. 2018. (Year: 2018).*
TW Office Action issued Oct. 3, 2025.

*Primary Examiner* — Nathnael Aynalem
(74) *Attorney, Agent, or Firm* — Perilla Knox & Hildebrandt LLP; James J. Rha

(57) ABSTRACT

The present invention relates to a 360-degree real-time video streaming and environmental analysis system and method. The system includes a 360-degree camera configured to obtain a 360-degree video of a work site, an environmental sensor module configured to measure environmental data including at least one of gas concentration, temperature, humidity, and pressure data of a work environment in real time, an embedded module configured to process the 360-degree video of the work site that is obtained by the 360-degree camera, and a data analysis unit configured to analyze the 360-degree video processed by the embedded module and the environmental data.

16 Claims, 3 Drawing Sheets

(51) Int. Cl.

| | |
|---|---|
| *G06V 10/94* | (2022.01) |
| *G06V 40/10* | (2022.01) |
| *G06V 40/16* | (2022.01) |
| *G06V 40/20* | (2022.01) |
| *H04N 7/18* | (2006.01) |

(52) U.S. Cl.
CPC ........... *G06V 40/171* (2022.01); *G06V 40/20* (2022.01); *H04N 7/183* (2013.01)

(58) Field of Classification Search
CPC .... G06V 40/20; G06V 40/168; G06V 40/174; H04N 7/183; H04N 21/42202; H04N 21/44008; H04N 7/181; A61B 5/0816; A61B 5/165
See application file for complete search history.

(56) References Cited

U.S. PATENT DOCUMENTS

| | | | | |
|---|---|---|---|---|
| 2019/0246075 A1* | 8/2019 | Khadloya | .............. | H04N 7/183 |
| 2020/0121256 A1* | 4/2020 | Mcduff | ................ | A61B 5/0077 |
| 2021/0228089 A1 | 7/2021 | Williams | | |
| 2023/0081472 A1* | 3/2023 | Wang | .................... | H04W 4/029 |
| | | | | 340/539.12 |
| 2025/0029488 A1* | 1/2025 | Zahid | .............. | G08G 1/096716 |

* cited by examiner

360-DEGREE REAL-TIME VIDEO STREAMING AND ENVIRONMENTAL ANALYSIS SYSTEM AND METHOD

CROSS-REFERENCE TO RELATED APPLICATION

This application claims priority to and the benefit of Korean Patent Application No. 10-2024-0139994, filed on Oct. 15, 2024, the disclosure of which is hereby incorporated herein by reference in its entirety.

BACKGROUND

1. Field of the Invention

The present invention relates to a 360-degree real-time video streaming and environmental analysis system and method, and more particularly, to a system for monitoring a work site or security environment at a remote location to improve safety by transmitting and analyzing a video in real time.

2. Discussion of Related Art

A digital twin technology is a technology for replicating a corresponding asset in a virtual space on the basis of real-time data of physical assets or systems to perform various simulations and analyses. Accordingly, the state of physical assets may be monitored in real time, future performance may be predicted, and maintenance and operation may be optimized. A digital twin technology is applied to various industrial sites such as manufacturing, energy industry, construction, transportation, etc., and serve to significantly improve safety through real-time monitoring and rapid response, especially in high-risk environments.

When a digital twin technology is applied in industrial sites, it is possible to prevent unexpected accidents or plan maintenance work in advance by continuously collecting and analyzing data on physical assets. For example, by monitoring the operating state of equipment in real time, abnormal signs may be detected early and problems may be resolved. Further, various scenarios may be simulated in a virtual environment to derive optimal operating methods, and accordingly, operational efficiency can be maximized and costs can be reduced.

However, conventional video streaming and environmental monitoring systems have several limitations that hinder the full implementation of digital twin technology. First, most conventional systems are operated depending on local networks, and thus it is difficult to transmit real-time data from a remote location and analyze the real-time data. Second, the conventional systems mainly rely on simple analysis patterns, and thus there are limitations in analyzing and responding in real time to various variables or risk factors that may occur in complex work environments. For example, artificial intelligence (AI)-based analysis systems currently in use may only analyze specific objects, such as facial recognition or whether a safety helmet is being worn, and are insufficient for comprehensively analyzing changes in the workers' state or environment.

In addition, the conventional systems lack the ability to integrate and process data from multiple cameras and various sensors. In advanced industrial environment, data should be collected by multiple cameras and sensors and analyzed comprehensively, but the conventional systems have limitations in integrating and processing such data in real time. As a result, real-time analysis and response capabilities are reduced.

Security issues are also important. The conventional systems are vulnerable to external attacks or hacking due to security vulnerabilities in the process of transmitting data over networks. In particular, systems that can be accessed remotely are more susceptible to data leaks or hacking, and strong encryption and security technologies are required to prevent such a problem.

Therefore, a demand for a system in which real-time 360-degree video streaming and AI-based video and environmental analysis are combined has emerged. Such a system should detect in real time various risk factors that may occur in industrial sites and security environments, monitor the industrial sites and security environments even at a remote location, and provide high security.

As a related art, Korean Patent Registration No. 10-2627538 is disclosed. This document relates to a safety education content generation system using a 360-degree panoramic video, and more particularly, to a method of constructing a virtual space on the basis of a video captured with a 360-degree panoramic camera for the purpose of safety education at construction sites, tagging risk factors, and providing education data.

However, the above system is operated based on a local network, and thus has limitations in monitoring or managing safety situations in real time at a remote location. Further, the above system focuses on generating educational content and post-management, and thus lacks a monitoring function for real-time situations occurring in actual industrial sites. Since the above system uses a method of transmitting the captured video to a server and then composes educational materials, it is difficult to immediately check or respond to the safety status of an industrial site at a remote location.

Further, network connectivity is limited to local areas, and thus there is a lack of structures that allow a remote manager or supervisor to monitor or respond to the safety status of the site in real time. Accordingly, it is difficult to respond rapidly to emergency situations and it is possible to reduce the efficiency of the overall safety management system.

Therefore, a system that can monitor and respond to safety situations in real time even at a remote location is required, and it is necessary to overcome the limitations of on-site management using this system.

SUMMARY OF THE INVENTION

The present invention is directed to providing a 360-degree real-time video streaming and environmental analysis system and method that can stream a 360-degree video in real time from anywhere without relying on a local network and improve security and safety management capabilities through video and environment analysis using artificial intelligence (AI).

According to an aspect of the present invention, there is provided a 360-degree real-time video streaming and environmental analysis system. The system includes a 360-degree camera configured to obtain a 360-degree video of a work site, an environmental sensor module configured to measure environmental data including at least one of gas concentration, temperature, humidity, and pressure data of a work environment in real time, an embedded module configured to process the 360-degree video of the work site that is obtained by the 360-degree camera, and a data analysis unit configured to analyze the 360-degree video processed by the embedded module and the environmental data, wherein the system provides the data analyzed by the data analysis unit in real time to a site worker or remote manager and supports the site worker or remote manager to perform safety management and response.

The data analysis unit may include an AI computation module configured to track a worker in the 360-degree video processed by the embedded module and perform real-time AI analysis for worker data, which includes at least one of face detection, person tracking, respiration and pulse analysis, and a sensor analysis module configured to analyze the environmental data received from the environmental sensor module in real time.

The system may further include a web server configured to receive the data analyzed by the data analysis unit and provide the received data together with the 360-degree video processed by the embedded module to a remote user in real time.

The system may further include an alarm module configured to provide a warning notification signal so that the site worker or remote manager visually or audibly recognizes a warning, the data analysis unit may analyze the worker data and the environmental data in real time, generates the warning notification signal, and transmit the generated warning notification signal to the alarm module, and the alarm module may transmit the warning notification signal to the web server.

The AI computation module may detect the worker's face from the 360-degree video processed by the embedded module, track the worker's state through human recognition, detects abnormal behavior or risk factors of the worker through image analysis, and generate the warning notification signal.

The AI computation module may analyze a minute color change occurring in the worker's face in the 360-degree video processed by the embedded module to detect a change in blood volume pulse (BVP) and estimate the worker's pulse state using the change.

The AI computation module may detect movement of the worker using a motion branch and remove an influence of a corresponding movement on biometric information analysis.

The AI computation module may track a change in worker's skin color for a certain period of time using an appearance branch to extract a change in BVP and breathing pattern.

The AI computation module may select a key area to be analyzed using an attention mask and filter an irrelevant area to increase the accuracy of biometric information estimation.

The AI computation module may measure a respiration cycle on the basis of zero crossings in a respiratory wave and analyzes the worker's respiratory state in real time.

The AI computation module may calculate a stress value on the basis of biometric information of the worker and generate the warning notification signal when the stress value exceeds a set value.

When a value of the environmental data exceeds a predetermined threshold value, the sensor analysis module may generate the warning notification signal on the basis of the environmental data and transmit the generated warning notification signal to the alarm module.

The system may further include an encryption module configured to encrypt the worker data and environmental data analyzed by the AI computation module and sensor analysis module, and then transmit the encrypted worker data and environmental data to the web server.

According to another aspect of the present invention, there is provided a 360-degree real-time video streaming and environmental analysis method, which is performed through a system including a 360-degree camera, an environmental sensor module, an embedded module, and a data analysis unit, includes operation a) of obtaining, by a 360-degree camera, a 360-degree video of a work site, operation b) of measuring, by an environmental sensor module, environmental data including at least one of gas concentration, temperature, humidity, and pressure data of a work environment in real time, operation c) of processing, by an embedded module, the 360-degree video of the work site that is obtained by the 360-degree camera, operation d) of analyzing, by a data analysis unit, the 360-degree video processed by the embedded module and the environmental data, and operation e) of providing the data analyzed by the data analysis unit in real time to a site worker or remote manager and supporting the site worker or remote manager to perform safety management and response.

The operation d) may include tracking, by an AI computation module, the worker in the 360-degree video processed by the embedded module and performing real-time AI analysis for worker data, which includes at least one of face detection, person tracking, respiration and pulse analysis, and area invasion detection, and analyzing, by a sensor analysis module, the environmental data received from the environmental sensor module in real time.

The operation e) may include receiving, by a web server, the data analyzed by the data analysis unit and providing the received data together with the 360-degree video processed by the embedded module to a remote user in real time.

The operation d) may include analyzing, by the data analysis unit, the worker data and the environmental data in real time, generating a warning notification signal, and transmitting the generated warning notification signal to the alarm module, and transmitting, by the alarm module, the generated warning notification signal to the web server, and the operation e) may further include providing, by the alarm module, the warning notification signal so that the site worker or remote manager visually or audibly recognizes a warning.

The operation d) may include detecting, by the AI computation module, the worker's face from the 360-degree video processed by the embedded module, tracking the worker's state through human recognition, detecting abnormal behavior or risk factors of the worker through image analysis, and generating the warning notification signal.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, specific embodiments of the present invention will be described with reference to the accompanying drawings. In addition, in descriptions of the present invention, when it is determined that detailed descriptions of known technology related to the present invention unnecessarily obscure the subject matter of the present invention, detailed descriptions thereof will be omitted.

Figure 1:
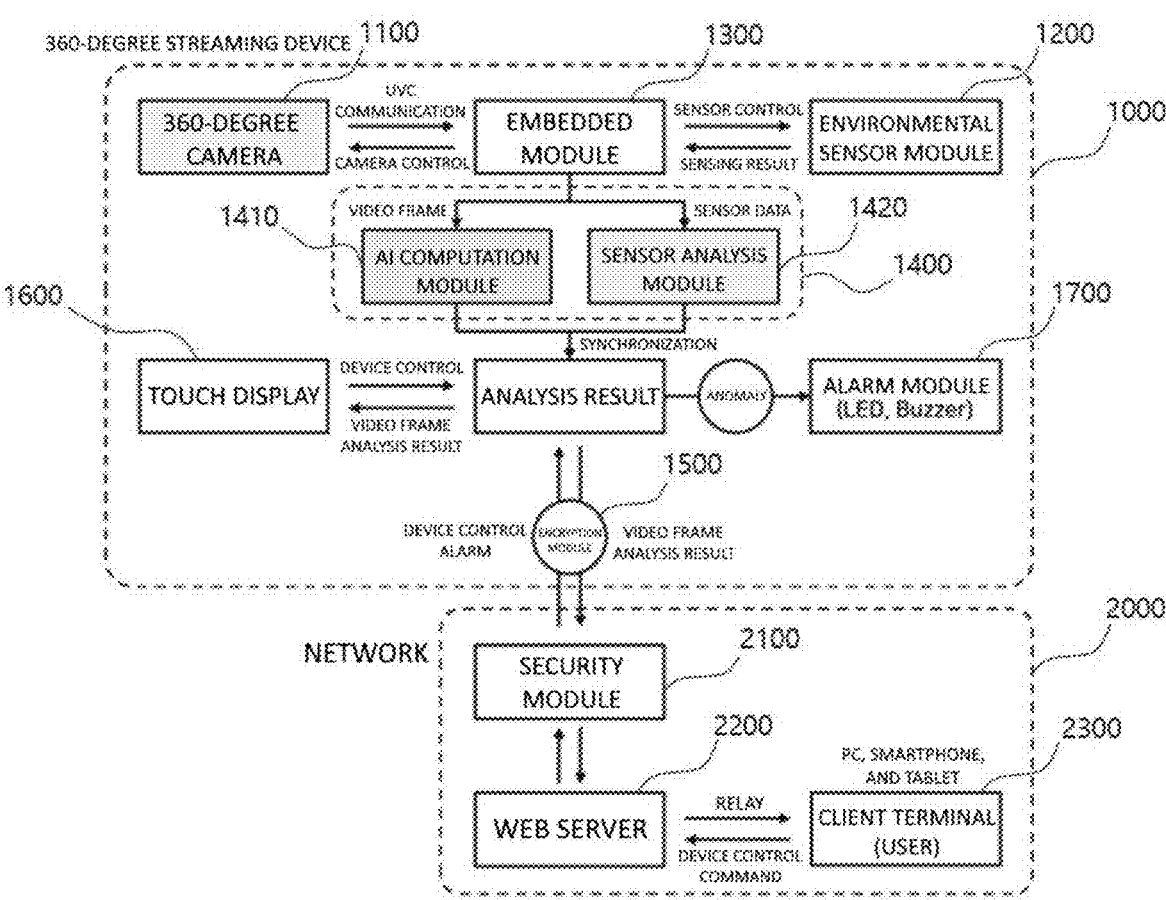
FIG. 1 is a diagram illustrating components of a 360-degree real-time video streaming and environmental analysis system according to the present invention.

FIG. 1 is a diagram illustrating each component of a 360-degree real-time video streaming and environmental analysis system according to the present invention.

Referring to FIG. 1, the 360-degree real-time video streaming and environmental analysis system according to the present invention is composed of a 360-degree streaming device 1000 and a network 2000. The 360-degree streaming device 1000 is composed of various modules that collect and process 360-degree videos and environmental data of a work site and transmits the data to a web server through a security module via the network 2000 so that the data can be checked in real time on a client terminal 2300. This connection enables real-time monitoring and analysis at a remote location.

The 360-degree streaming device 1000 may include a 360-degree camera 1100, an environmental sensor module 1200, an embedded module 1300, a data analysis unit 1400 having an artificial intelligence (AI) computation module 1410 and a sensor analysis module 1420, an encryption module 1500, a touch display 1600, and an alarm module 1700. The network 2000 may include a security module 2100, a web server 2200, and a client terminal 2300.

The 360-degree camera 1100 obtains a 360-degree video of the work site in real time and transmits the obtained 360-degree video to the embedded module 1300. For example, a high-performance camera such as the Ricoh 360 camera simultaneously captures videos at various angles through a plurality of lenses to provide an all-around 360-degree video and monitors the worker's activities and changes in surrounding environment in real time using the provided all-around 360-degree video. Such a capturing method is utilized to rapidly identify risk factors that may occur in the work site and is also advantageous for checking the number of workers and comparing the work site before and after work.

The 360-degree camera 1100 may support various resolutions such as 1K, 2K, and 4K resolutions, and a user may select an appropriate image quality according to the work environment and network status. A 4K high-resolution video is effective for security surveillance and safety management because details of the work site may be clearly checked, while a 1K low-resolution video is suitable for real-time monitoring because a network bandwidth is reduced so that smoother streaming is provided.

The collected videos may be transmitted in real time to the embedded module 1300 through the Universal Serial Bus (USB) video class (UVC) protocol, and the embedded module 1300 may process and analyze corresponding data. The 360-degree camera 1100 may monitor the work site at all angles in all directions and thus provide an important basis for analyzing risks that may occur while the worker is moving or performing a specific work in real time. Further, the 360-degree camera 1100 may be linked with a deep learning-based AI solution in conjunction with the Nvidia Jetson Nano, and thus perform advanced functions such as biometric information analysis and work situation recording.

A system of the 360-degree camera 1100 may be operated by a power source connected thereto or using a battery pack, and support water resistance, allowing stable operation in various work environments. It is possible to immediately check the work site through real-time streaming on the client terminal 2300 such as a smartphone or a tablet computer through router equipment, and it is possible for a warning sound notification function to rapidly respond when a problem occurs in the work site.

The environmental sensor module 1200 serves to collect various environmental data of the work site in real time to maintain the safety of the work site. The environmental sensor module 1200 continuously monitors data such as gas concentration, temperature, humidity, pressure, etc., and collects data in real time to detect early potential risk factors that may occur in the work environment.

The collected environmental data is first transmitted to the embedded module 1300 and then transmitted to the sensor analysis module 1420. The sensor analysis module 1420 analyzes the environmental data transmitted through the embedded module 1300 in real time to rapidly detect an anomaly or dangerous situation. For example, when the gas concentration exceeds a preset threshold, the sensor analysis module 1420 may immediately generate a warning signal and warn of the worker or manager through the alarm module 1700.

The environmental sensor module 1200 is very useful, particularly in factories or sites where hazardous materials are used and provides a function for analyzing data in real time and transmitting a warning immediately as necessary to prevent the worker from being in danger. Accordingly, the work site can be safely maintained.

Further, the collected environmental data may be encrypted and transmitted to the web server 2200 through the embedded module 1300 and the sensor analysis module 1420, and thus real-time monitoring may be performed even at a remote location. A remote manager or worker may check an environmental status of the work site in real time through this system and respond thereto immediately when an abnormality is detected.

The embedded module 1300 serves to process and transmit the 360-degree video and environmental data in real time. The embedded module 1300 integrates and processes the data collected by the 360-degree camera 1100 and environmental sensor module 1200, and then transmits the collected data to the AI computation module 1410 and the sensor analysis module 1420.

First, the embedded module 1300 receives and processes videos with 1K, 2K, or 4K resolution transmitted from the 360-degree camera 1100 through the UVC protocol. The embedded module 1300 may select an optimal resolution according to the network bandwidth and processing requirements. Further, the embedded module 1300 may receive the environmental data, such as gas concentration, temperature, humidity, pressure, etc., collected by the environmental sensor module 1200 and perform real-time monitoring.

The embedded module 1300 processes the collected data and then transmits the processed data to the sensor analysis module 1420, and the sensor analysis module 1420 analyzes the data in real time. When gas concentration exceeds a preset threshold or an abnormal situation is detected in the work environment, the sensor analysis module 1420 generates a warning signal and warns of the worker and manager through the alarm module 1700.

In this process, the embedded module 1300 is responsible for transmitting and processing data, and ultimately, the AI computation module 1410 and the sensor analysis module 1420 analyze the data and detect a dangerous situation. Further, all the data is encrypted and transmitted to the web server 2200, and the status of the work site may be monitored in real time even at a remote location. Accordingly, the remote manager or worker may check the environmental status of the work site and respond immediately when an abnormality is detected. As a result, the embedded module 1300 plays an important role in maintaining the safety of the work site by processing the data in real time and transmitting the data to the data analysis unit 1400.

The data analysis unit 1400 serves to analyze the videos and environmental data, which are collected at the work site, in real time and detect a dangerous situation. The data analysis unit 1400 is composed of the AI computation module 1410 and the sensor analysis module 1420 and may each analyze the worker's state and the environmental data, and immediately generate a warning signal when a dangerous situation is detected.

Figure 2:
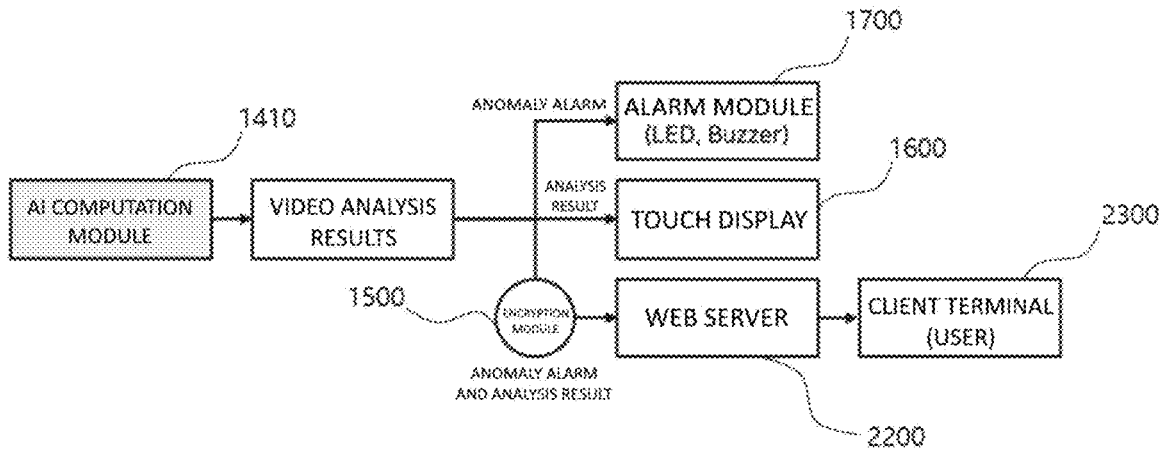
FIG. 2 is a diagram illustrating a path along which a result analyzed by an artificial intelligence (AI) computation module and an alarm generated when an anomaly occurs are transmitted to a worker or remote user according to the present invention.
Figure 3:
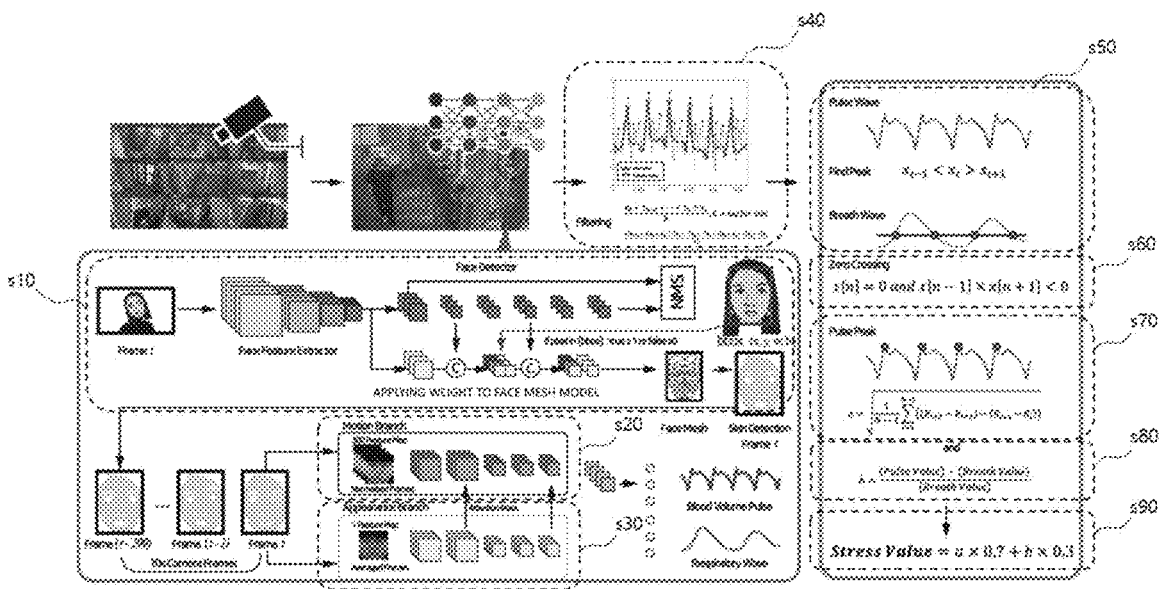
FIG. 3 is a diagram illustrating respective processes of a real-time biometric information estimation technology applied to the AI computation module according to the present invention.

FIG. 2 is a diagram illustrating a path along which a result analyzed by an AI computation module and an alarm generated when an anomaly occurs are transmitted to a worker or remote user according to the present invention. FIG. 3 is a diagram illustrating respective processes of a real-time biometric information estimation technology applied to the AI computation module according to the present invention.

Referring to FIGS. 2 and 3, the AI computation module 1410 plays an important role in analyzing the videos transmitted in real time from the 360-degree camera 1100 to estimate biometric information of the worker. This module detects a face using a deep learning-based algorithm and extracts main features of the face by utilizing the Face Mesh or a face detector technology (s10). Accordingly, a change in blood volume pulse (BVP) and a respiration cycle may be estimated and vital signs of the worker may be analyzed.

In this process, a motion branch s20 and an appearance branch s30 work together. The motion branch serves to capture patterns that change minutely over time in the real-time video and analyzes pulse and breathing by measuring a minute change in facial surface. Specifically, the pulse is analyzed based on subtle skin color changes caused by blood flow changes, and the respiratory rate may be inferred by temporally analyzing the expansion and contraction patterns of facial skin. The appearance branch is used to extract visual static information from each frame and analyzes the locations of the face and skin within the frame by extracting common features of the input accumulated frames.

Attention Mask serves to select a main area to be analyzed, filter out unnecessary background, and emphasize important spatial and temporal features. Accordingly, the model may extract features mainly from an important skin area rather than the entire image, thereby increasing the accuracy of biosignal analysis.

After the face is detected, a Region of Interest is set, and the face areas are aligned in each frame using rotation values of the face. Through this alignment process, the performance of the biometric analyzer is improved, and a rotation value of the face is calculated based on coordinates of eyes, nose, and mouth in horizontal and vertical terms. In this process, the rotation of the face area is calculated in the form of the eyes being horizontal and the nose and mouth being vertical. Thereafter, the skin area is calculated again within the Region of Interest of the face, and the remaining skin areas excluding the eyes, eyebrows, and mouth are set using the landmark coordinates obtained after the Face Mesh is detected, the background is removed, and thus the accuracy of the biometric analyzer is improved.

The overall process of FIG. 3 consists of image acquisition, face detection, skin area calculation, pulse and respiration waveform analysis, waveform noise removal filtering, digitization (number of times per minute), and stress index analysis.

In a waveform analysis process, waveform noise removal filtering s40 is performed. A moving average filter and a Conv filter are applied to the waveform noise removal filtering s40. First, the moving average filter removes basic noise by processing data using the following formula.

$$\frac{x_{10} + x_9 + x_8 + x_7 + x_6 + x_5 + x_4 + x_3 + x_2 + x_1}{10} \qquad \text{(Formula 1)}$$

Each x denotes a value of an input signal. These values are signal samples listed in time order, with x1 being the oldest sample and x10 being the most recent sample. These values are consecutively measured data and are for 10 samples taken from an original signal before filtering. In the above formula, 10 is a value of a divisor when an average is calculated, and in this case, since 10 samples are averaged, the sum of the 10 values is divided by 10. That is, all the 10 sample values are added and then the obtained value is divided by 10 to obtain an average value. Accordingly, short-term signal fluctuations may be averaged, and noise in areas where the signal fluctuates significantly may be reduced and the signals may be smoothed.

The Conv filter removes noise through the following formula while peaks and trend of a waveform are maintained. The Conv filter uses an operation similar to the convolution operation of artificial intelligence, is applied to a one-dimensional array, and is suitable for processing time series data.

$$\frac{1}{10}(-3x_{10} - 2x_9 - x_8 + 3x_7 + 7x_6 + 7x_5 + 3x_4 - x_3 - 2x_2 - 3x_1) \qquad \text{(Formula 2)}$$

Each x denotes a value of an input signal. These values are signal samples listed in time order, with x1 being the oldest sample and x10 being the most recent sample. That is, the last 10 samples of the input signal are used in the filtering process. The number in front of each signal sample denotes a weight assigned to the corresponding sample. The weight serves to determine how important the sample is to be treated when filtering.

The $\frac{1}{10}$ in front of the above formula serves to scale a result. This is a task of dividing the sum of the weighted samples by 10 to average the weighted samples. This value serves to adjust the overall value so that the filtering result does not become too large. In Formular 2 above, the weights are composed of $-3$, $-2$, $-1$, 3, and 7, and such a pattern is effective in capturing the signal changes by emphasizing or softening specific patterns of the signal.

Thereafter, the number of peaks in the waveform is analyzed and converted into the pulse rate per minute (s50). The peak is a state in which a current value in the waveform is greater than both of previous and subsequent values and has a shape that forms a vertex of the waveform. In this process, the following formula is used.

$$x[n-1] < x[n] \text{ and } x[n+1] < x[n] \qquad \text{(Formula 3)}$$

A respiration rate is converted into a respiration rate per minute by calculating zero crossing points (s60). In zero crossing, an inhalation and exhalation cycle is calculated based on the number of points where a waveform crosses zero, and the zero crossing points are calculated using the following formula.

$$x[n] = 0 \text{ and } x[n-1] \times x[n+1] < 0 \qquad \text{(Formula 4)}$$

In addition, a stress index is calculated by analyzing pulse diversity and a correlation between pulse/respiration. When a person is stressed, the pulse becomes constant, and in a normal state, the pulse is changed variously, and thus it is determined that the more diverse the waveform of the pulse is, the stress index is lower. Further, an imbalance between the pulse and the respiration may indicate a stress state.

The stress index is calculated using the following formula (s70). The following formula is root mean square of successive differences (RMSSD) and is a formula for evaluating pulse variability.

$$a = \sqrt{\frac{1}{N-1} \sum_{i=1}^{N-1} ((R_{i+2} - R_{i+1}) - (R_{i+1} - R_i))} \qquad \text{(Formula 5)}$$

In the above formula, N denotes a total number of R-R intervals. The R-R interval denotes a time interval between two consecutive electrocardiogram signals (i.e., two heartbeats) that generate a heart rate. This value is a total number of heartbeat intervals in the above formula, and an average value calculated in the above formula is adjusted through this value.

$R_{i+2}$, $R_{i+1}$, and $R_i$ denote consecutive heartbeat intervals. These values denote time intervals during which each heartbeat occurs, and are called R-R intervals. The above difference $(R_{i+2} - R_{i+1}) - (R_{i+1} - R_i)$ is calculated for all intervals from i=1 to N−1, and results thereof are summed. This formula calculates an average value by squaring the differences between the consecutive heartbeat intervals (R-R intervals) and converts the average value into its square root to calculate a value indicating heart rate variability.

A larger RMSSD value means that the heart rate occurs at more varied intervals, indicating that the heart is responding more appropriately. On the other hand, a lower RMSSD value means that the heart rate variability is less and the heart rate continues at a consistent interval, and this is a result of high stress or poor health.

Further, a correlation value between pulse and respiration is analyzed using the following formula (s80).

$$b = \frac{(\text{Pulse Value}) - (\text{Breath Value})}{(\text{Breath Value})} \qquad \text{(Formula 6)}$$

In the above formula, Pulse Value is a pulse value. This pulse value is a value indicating the number of heartbeats per minute and is derived based on previously measured pulse data. Generally, a pulse value is calculated based on the number of pulse peaks. Breath Value is a respiration value. This respiration value denotes a respiration rate per minute and is derived by measuring a respiration cycle through zero crossing in a respiration curve. That is, the respiration value is a value of the respiration rate per minute calculated based on the intersections of inhalation and exhalation.

In the above formula, a difference between pulse and respiration is divided by the respiration value. This is a process of normalizing a difference between two values on the basis of the respiration value in order to evaluate a relative difference between pulse and respiration. This value indicates a correlation between pulse and respiration, which helps to evaluate a stress state. A large value means that the pulse and the respiration are significantly mismatched.

Finally, the stress index is calculated using the following formula (s90).

$$\text{Stress Value} = a \times 0.7 + b \times 0.3 \qquad \text{(Formula 7)}$$

In the above formula, Stress Value is a value calculated by weighting a value a (pulse variability) and a value b (mismatch between pulse and respiration). a×0.7 plays a more important role in pulse variability, and b×0.3 plays a secondary role considering the correlation between pulse and respiration. The larger Stress Value, the higher stress, and the more likely the body is to be in an unstable state. Conversely, the smaller Stress Value, the lower stress, and the more likely the body is to be in a stable state.

Accordingly, the AI computation module 1410 of the present invention may evaluate and analyze a stress value of the worker in real time.

Such a video-based biometric information analysis technology is performed a non-contact method so that the health status of workers may be monitored without additional sensors. This technology is effective not only for safety management but also for stress management and health status of workers. In particular, this technology enables immediate response on-site through real-time streaming and analysis capabilities and may be usefully utilized in various industrial sites and security systems.

Figure 4:
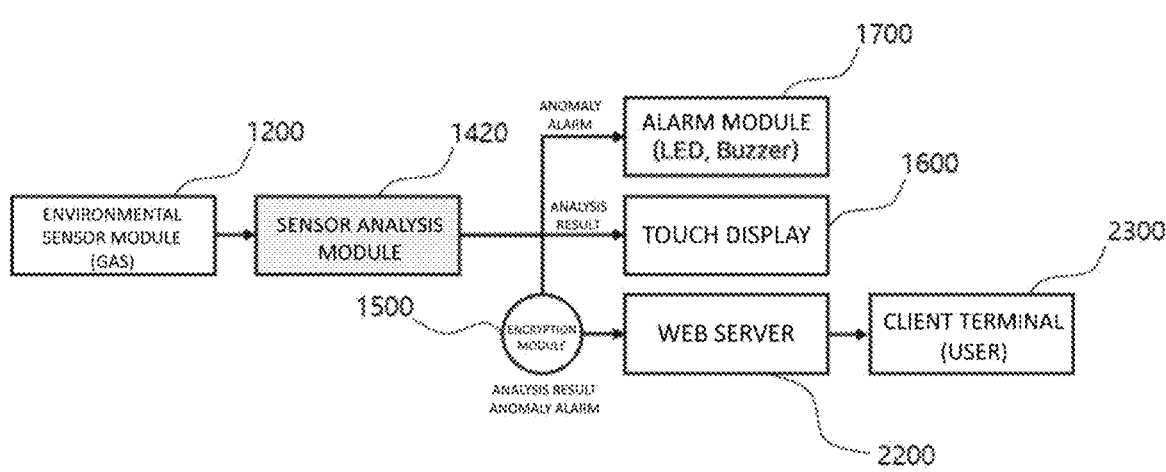
FIG. 4 is a diagram illustrating a path along which a result analyzed by a sensor analysis module and an alarm generated when an anomaly occurs are transmitted to a worker or remote user according to the present invention.

FIG. 4 is a diagram illustrating a path along which a result analyzed by a sensor analysis module and an alarm generated when an anomaly occurs are transmitted to a worker or remote user according to the present invention.

Referring to FIG. 4, the sensor analysis module 1420 analyzes environmental data, such as gas concentration, temperature, humidity, pressure, etc., which is collected by the environmental sensor module 1200, in real time. The sensor analysis module 1420 immediately generates a warning signal when a change in environment that exceeds a preset threshold occurs. For example, when the concentration of a hazardous gas reaches a dangerous level, the sensor analysis module 1420 immediately generates a warning signal and notifies the warning of a worker and manager. The warning may also be transmitted to a work site through the alarm module 1700, and at the same time, transmitted in an encrypted form to the web server 2200, and thus a remote user may also monitor an environmental status of the work site in real time.

The encryption module 1500 is a security component of the present invention and is used to safely transmit 360-degree video data and environmental data. In the present invention, data collected by various sensors and the 360-degree camera 1100 is processed by the embedded module 1300 and the data analysis unit 1400 and then transmitted to the remote user through the web server 2200. In this process, in order to prevent sensitive data from being leaked to the outside or accessed without authorization, the encryption module 1500 encrypts the corresponding data and safely transmits the encrypted data.

The encryption module 1500 encrypts the data, which is analyzed by the AI computation module 1410 and sensor analysis module 1420, in real time. For example, all the data is encrypted to safely protect sensitive information such as worker's face recognition, breathing, and pulse state, as well as environmental data such as gas concentration, temperature, humidity, etc. This encrypted data is transmitted through a network, and thus the data is safely protected from external threats.

Further, the encryption module 1500 ensures security in communication between the web server 2200 and the client terminal 2300. When the client terminal 2300 monitors data at a remote location or receives a notification, the data is safely transmitted through an encryption protocol such as Secure Sockets Layer (SSL)/Transport Layer Security (TLS). For example, when the AI computation module 1410 detects a dangerous situation for the worker or the sensor analysis module 1420 detects an anomaly in the environmental data, an alarm signal is generated, and this signal is also transmitted in an encrypted form so that the remote user may safely receive a warning.

As a result, the encryption module 1500 safely protects all the data generated in the present invention and maintains the integrity and confidentiality of the data while being transmitted over the network, thereby blocking intrusions or threats from the outside. Through this, the system is guaranteed to be secure while enabling real-time monitoring and receiving warnings at a remote location.

The touch display 1600 serves to provide a user interface through which the status of the work site can be monitored in real time. Through the touch display 1600, the user may immediately check the status of the system, streaming videos, AI analysis results, environmental sensor data, etc., and results based on the analyzed data are also displayed in real time on the touch display 1600. The user may rapidly identify an abnormal situation that has occurred through the touch display 1600 and take immediate action as necessary. For example, when the AI computation module 1410 detects an abnormality in the worker's breathing or risk factors, corresponding information is visually displayed on the touch display 1600, and the worker may recognize the abnormality or risk factors and respond to the abnormality or risk factors. Further, the touch display 1600 provides an intuitive user experience to aid managing of the work environment in real time without complex system settings.

The alarm module 1700 is a component that transmits the abnormal situation occurring at the work site as a visual or auditory warning. The alarm module 1700 is composed of a physical device such as a processor, a light-emitting diode (LED), or a buzzer, and operates immediately when a dangerous situation is detected by the AI computation module 1410 or the sensor analysis module 1420. For example, when a gas sensor detects a hazardous concentration of harmful gas or when the AI computation module 1410 identifies an abnormal behavior of the worker, the alarm module 1700 is activated to generate a warning sound or turn on a warning light so that the worker or site manager can rapidly recognize the abnormality. This alarm is an essential function for ensuring the safety of workers on site, and enables an immediate response within the site.

The security module 2100 is included in the network 2000 and safely protects the data transmitted from the 360-degree streaming device 1000 to the web server 2200. The security module 2100 prevents external attacks or data leaks through a firewall and encryption technology and encrypts all the data transmitted through the network to maintain integrity and confidentiality.

Accordingly, remote users may access the system to safely check the data and monitor the streaming video and also minimize security risks by blocking attempts to illegally manipulate or steal data. During the data transmission process, the security module 2100 encrypts and processes the data, and protects the data so that the data can safely reach the client terminal 2300.

The web server 2200 serves to transmit and stream the 360-degree video data processed by the embedded module 1300 and the environmental data, and the data analysis unit 1400 to the remote user in real time through a web page. The present invention maximizes efficiency because the user can access the system with various devices such as smartphones, tablets, and PCs without a separate dedicated device. Further, it is easy to use and has excellent accessibility because the user can access the system only with a web browser without installing an app.

The web server 2200 is designed to safely receive the data collected at the work site through the encryption module 1500 and provide the data to several clients simultaneously. The data transmitted to the web server 2200 is protected through the security module 2100 including a firewall, and all the data is safely encrypted. Accordingly, security risks when the data is accessed from the outside may be minimized.

First, the web server 2200 receives the 360-degree video data processed by the embedded module 1300 and the data analyzed by the AI computation module 1410 and the sensor analysis module 1420 in real time. In this case, the data is protected through the encryption module 1500, and the web server 2200 safely processes the data and transmits the data to the client terminal 2300 of the remote user. The client terminal 2300 may include a PC, a smartphone, a tablet computer, etc. The user may access the web server 2200 through a web browser or dedicated application and check the 360-degree video in real time at various resolutions such as 1K, 2K, and 4K resolutions.

The web server 2200 not only simply streams the video, but also transmits an anomaly or risk signal detected by the AI computation module 1410 and the sensor analysis module 1420. For example, when the worker enters a risk section or gas concentration exceeds a risk level, a corresponding warning signal is transmitted to the remote user in real time through the web server 2200. This not only helps with warning notifications on-site, but also helps to recognize warnings and respond immediately at a remote location.

Further, the web server 2200 is designed to provide a stable streaming environment so that a plurality of users can simultaneously access the web server 2200, and to process the data smoothly without conflicts between the users. The system may be operated efficiently even with a small number of people, and the status of the work site may be monitored in real time regardless of physical distances, and thus the system may be built and operated at a relatively low cost even in a wide area. The system may check and respond to data in a security-enhanced environment, and functions may be easily added and updated.

The client terminal 2300 is a device that receives the 360-degree video data and the environmental data transmitted in real time from the web server 2200, and may include various devices such as a PC, a smartphone, a tablet computer, etc. These devices may access the web server through a web browser or a dedicated application and allow the user to monitor the status of the work site in real time and respond to the warning signal as necessary.

In particular, the client terminal 2300 may access the system only with a web browser without installing an app, and thus may easily access the system without installing separate software, and the client terminal 2300 has excellent accessibility and ease of use. Through the client terminal 2300, the user may check the streaming video in real time in various resolutions such as 1K, 2K, and 4K resolutions and also check the anomaly or risk signal detected by the AI computation module 1410 and the sensor analysis module 1420 in real time.

The client terminal 2300 provides a smooth streaming environment even when a plurality of users are connected simultaneously, and thus enables monitoring of the work site and rapid response from anywhere.

According to the present invention, it is possible to overcome the limitations of conventional local network-based systems to stream a 360-degree video in real time even at a remote location through a web server. Accordingly, users can easily monitor work sites or security systems from anywhere without being restricted by physical distances, and thus real-time response capabilities can be significantly improved.

Further, real-time image analysis using AI is possible in an embedded module, and thus it is possible to immediately detect abnormal behavior and transmit warnings in industrial sites or security situations through face detection, human recognition, respiration and pulse analysis, detection of intrusion into a designated area, etc. Therefore, it is possible to provide a great effect in terms of accident prevention and safety management.

Further, it is possible to monitor gas concentration in a work environment in real time through a gas sensor, and immediately transmit a warning when a dangerous situation occurs to secure the safety of workers. This system can provide physical and remote warnings simultaneously to enable a rapid and efficient response.

Further, by applying encryption and security modules when data is transmitted, the system can be safely protected from external attacks. Accordingly, it is possible to minimize security risks while remotely checking real-time data, and thus it is possible to support the system to operate more safely.

The protection scope in this field is not limited to descriptions and expressions of embodiments explicitly described above. In addition, it is added once again that the scope of the present invention may not be limited due to obvious changes or substitutions in the technical field to which the present invention belongs.

What is claimed is:

1. A 360-degree real-time video streaming and environmental analysis system comprising a 360-degree streaming device used at a work site and a network connected to the 360-degree streaming device, the 360-degree streaming system comprising:

a 360-degree camera configured to obtain a 360-degree video of the work site;

an environmental sensor module configured to measure environmental data including at least one of gas concentration, temperature, humidity, and pressure data of a work environment in real time;

an embedded module configured to process the 360-degree video of the work site that is obtained by the 360-degree camera; and a data analysis unit configured to analyze the 360-degree video processed by the embedded module and the environmental data, wherein the system provides the data analyzed by the data analysis unit in real time to a site worker or remote manager and supports the site worker or remote manager to perform safety management and response, wherein the data analysis unit includes an artificial intelligence (AI) computation module configured to track a worker in the 360-degree video processed by the embedded module and to perform real-time AI analysis for worker data including at least one of face detection, person tracking, respiration and pulse analysis, and area invasion detection, the AI computation module being configured to analyze minute color changes occurring in the worker's face in the 360-degree video processed by the embedded module to detect a change in blood volume pulse (BVP) and to estimate the worker's pulse state based thereon, to infer a respiration rate by temporally analyzing expansion and contraction patterns of facial skin and thereby to generate biometric information of the worker, and to calculate a stress value by using as respective variability of the pulse state and a degree of mismatch between the pulse state and the respiration rate while assigning predetermined weights thereto, and to generate a warning notification signal when the stress value exceeds a set value.

2. The system of claim 1, wherein the data analysis unit further includes a sensor analysis module configured to analyze the environmental data received from the environmental sensor module in real time.

3. The system of claim 2, further comprising a web server configured to receive the data analyzed by the data analysis unit and provide the received data together with the 360-degree video processed by the embedded module to a remote user in real time.

4. The system of claim 3, further comprising an alarm module configured to provide a warning notification signal so that the site worker or remote manager visually or audibly recognizes a warning, wherein the data analysis unit analyzes the worker data and the environmental data in real time, generates the warning notification signal, and transmits the generated warning notification signal to the alarm module, and the alarm module transmits the warning notification signal to the web server.

5. The system of claim 4, wherein the AI computation module detects the worker's face from the 360-degree video processed by the embedded module, tracks the worker's state through human recognition, detects abnormal behavior or risk factors of the worker through image analysis, and generates the warning notification signal.

6. The system of claim 1, wherein the AI computation module detects movement of the worker using a motion branch and removes an influence of a corresponding movement on biometric information analysis.

7. The system of claim 1, wherein the AI computation module tracks a change in worker's skin color for a certain period of time using an appearance branch to extract a change in BVP and breathing pattern.

8. The system of claim 5, wherein the AI computation module selects a key area to be analyzed using an attention mask and filters an irrelevant area to increase the accuracy of biometric information estimation.

9. The system of claim 5, wherein the AI computation module measures a respiration cycle on the basis of zero crossings in a respiratory wave and analyzes the worker's respiratory state in real time.

10. The system of claim 4, wherein, when a value of the environmental data exceeds a predetermined threshold value, the sensor analysis module generates the warning notification signal on the basis of the environmental data and transmits the generated warning notification signal to the alarm module.

11. The system of claim 3, further comprising an encryption module configured to encrypt the worker data and environmental data analyzed by the AI computation module and sensor analysis module and then transmit the encrypted worker data and environmental data to the web server.

12. A 360-degree real-time video streaming and environmental analysis method, which is performed through a system including a 360-degree streaming device having a 360-degree camera, an environmental sensor module, an embedded module, and a data analysis unit having an AI computation module, and a network connected to the 360-degree streaming device, the method comprising:

step a) of obtaining, by the 360-degree camera, a 360-degree video of a work site;

step b) of measuring, by the environmental sensor module, environmental data including at least one of gas concentration, temperature, humidity, and pressure data of a work environment in real time;

step c) of processing, by the embedded module, the 360-degree video of the work site that is obtained by the 360-degree camera;

step d) of analyzing, by the data analysis unit, the 360-degree video processed by the embedded module and the environmental data; and step e) of providing the data analyzed by the data analysis unit in real time to a site worker or remote manager and supporting the site worker or remote manager to perform safety management and response wherein, in step (d), the AI computation module tracks the worker in the 360-degree video processed by the embedded module and performs real-time AI analysis for worker data including at least one of face detection, person tracking, respiration and pulse analysis, and area invasion detection, analyzes minute color changes occurring in the worker's face in the video processed by the embedded module to detect a change in blood volume pulse (BVP) and to estimate the worker's pulse state, temporally analyzes expansion and contraction patterns of the worker's facial skin to inter a respiration rate, and thereby generates biometric information of the worker, and calculates a stress value by using, as respective parameters, ability of the pulse state and a degree of mismatch between the pulse state and the respiration rate while assigning predetermined weights thereto, and generates a warning notification signal when the stress value exceeds a set value.

13. The method of claim 12, wherein, in step (d), a sensor analysis module analyzes, in real time the environmental data received from the environmental sensor module.

14. The method of claim 13, wherein the step e) includes receiving, by a web server, the data analyzed by the data analysis unit and providing the received data together with the 360-degree video processed by the embedded module to a remote user in real time.

15. The method of claim 14, wherein the step d) includes analyzing, by the data analysis unit, the worker data and the environmental data in real time, generating a warning notification signal, and transmitting the generated warning notification signal to the alarm module, and transmitting, by the alarm module, the generated warning notification signal to the web server, and the step e) further includes providing, by the alarm module, the warning notification signal so that the site worker or remote manager visually or audibly recognizes a warning.

16. The method of claim 15, wherein the step d) includes detecting, by the AI computation module, the worker's face from the 360-degree video processed by the embedded module, tracking the worker's state through human recognition, detecting abnormal behavior or risk factors of the worker through image analysis, and generating the warning notification signal.

* * * * *